United States Patent
Sugaya

(10) Patent No.: US 6,628,640 B1
(45) Date of Patent: Sep. 30, 2003

(54) TRANSMISSION CONTROL METHOD AND TRANSMISSION APPARATUS

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,187

(22) Filed: Apr. 1, 1999

(30) Foreign Application Priority Data

Apr. 7, 1998 (JP) .......................................... P10-095040

(51) Int. Cl.[7] .............................................. H04B 7/212
(52) U.S. Cl. ...................... 370/348; 370/354; 370/503; 370/389; 370/345; 455/502; 455/524
(58) Field of Search ................. 370/350, 503, 370/509, 329, 337, 347, 338, 348, 459, 462, 522, 336, 345; 455/522, 69, 502, 524

(56) References Cited

U.S. PATENT DOCUMENTS

| | | | | |
|---|---|---|---|---|
| 5,285,443 A | * | 2/1994 | Patsiokas et al. | 370/29 |
| 5,684,806 A | * | 11/1997 | Akiyama | 370/522 |
| 5,757,788 A | * | 5/1998 | Tatsumi et al. | 370/336 |
| 5,805,576 A | * | 9/1998 | Worley, III et al. | 370/337 |
| 5,867,484 A | * | 2/1999 | Shaunfield | 370/395.51 |
| 5,999,818 A | * | 12/1999 | Gilbert et al. | 455/448 |
| 6,094,421 A | * | 7/2000 | Scott | 370/280 |
| 6,128,282 A | * | 10/2000 | Liebetreu et al. | 370/235 |
| 6,266,702 B1 | * | 7/2001 | Darnell et al. | 709/236 |
| 6,317,415 B1 | * | 11/2001 | Darnell et al. | 370/230 |
| 6,359,871 B1 | * | 3/2002 | Chung et al. | 370/338 |
| 6,360,077 B2 | * | 3/2002 | Mizoguchi | 455/67.3 |
| 6,381,647 B1 | * | 4/2002 | Darnell et al. | 709/232 |
| 2002/0018458 A1 | * | 2/2002 | Aiello et al. | 370/348 |

* cited by examiner

Primary Examiner—William Trost
Assistant Examiner—Danh Le
(74) Attorney, Agent, or Firm—Jay H. Maioli

(57) ABSTRACT

A transmission control method and a transmission apparatus effectively utilize a transmission band by simple control, wherein data transmission areas (d1, d2) and data transmission areas (d3,d4) are standardized within a frame period, a plurality of slots (S1) to (S16) are disposed within the data transmission area, and each slot using situation data at each communication station or a control station in the data transmission area is transmitted in the management data transmission area.

8 Claims, 13 Drawing Sheets

Frame Arrangement

Management Area Arrangement

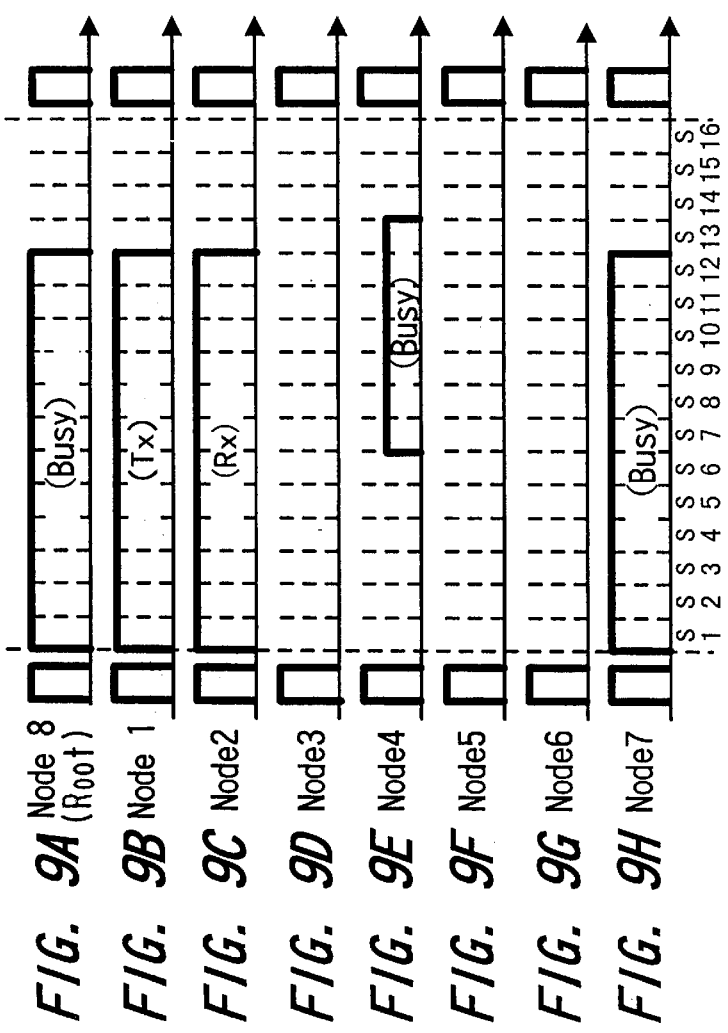

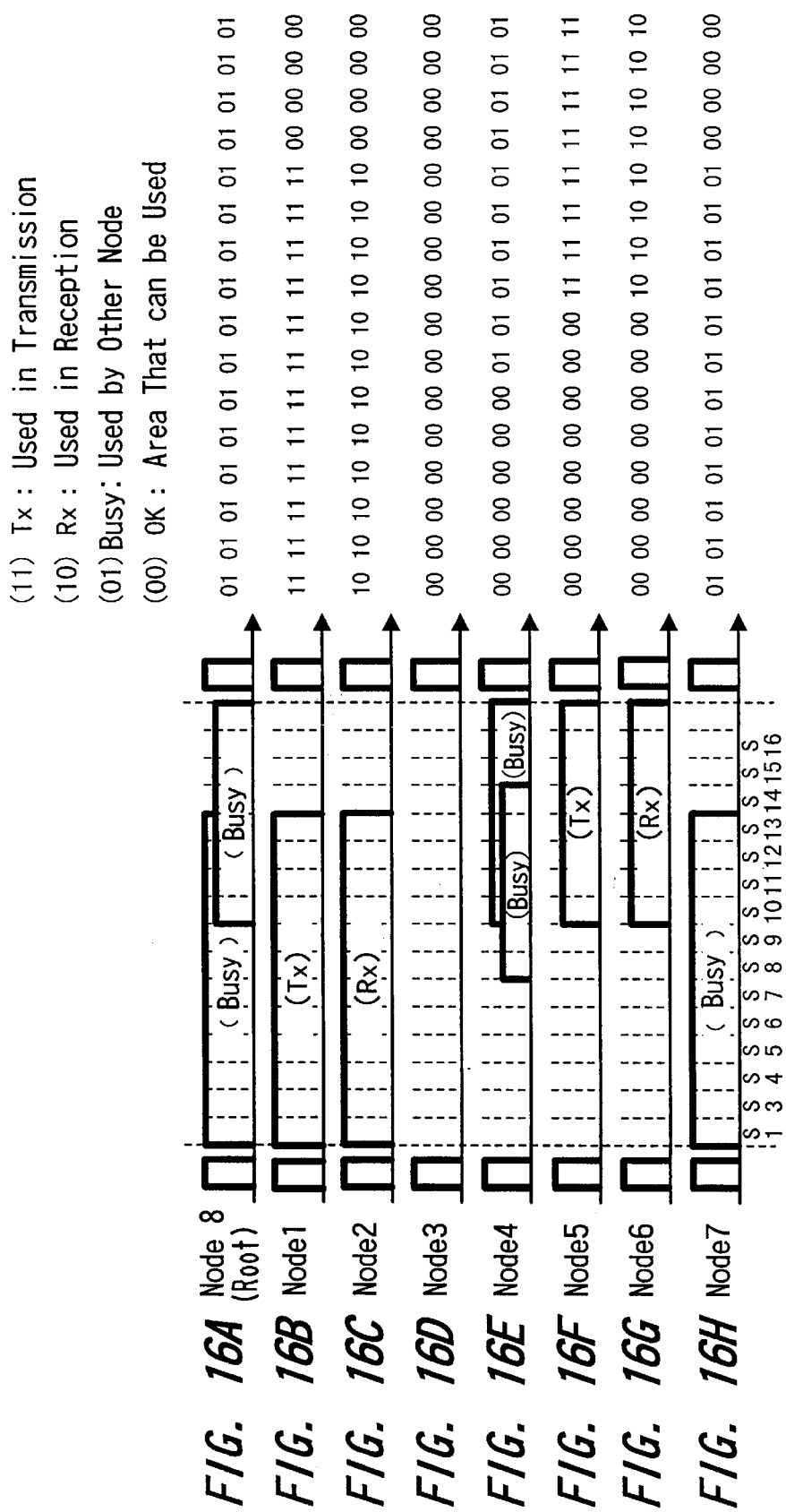

TRANSMISSION CONTROL METHOD AND TRANSMISSION APPARATUS

BACKGROUND OF THE INVENTION

1. Field of the Invention

The present invention relates to a transmission control method for use in arranging a local area network (LAN) among a plurality of equipment by transmitting various information via radio waves, for example, and a transmission apparatus to which this transmission control method is applied.

2. Description of the Related Art

Heretofore, there has been arranged a local area network capable of transmitting data handled by a plurality of equipment among a variety of video equipment and a plurality of equipment such as a personal computer and its peripheral devices in a relatively narrow range such as homes, offices and so on. In this case, instead of directly connecting respective equipment by signal lines, transmission and reception apparatus (radio transmission apparatus) for transmitting and receiving radio signals are connected to respective equipment and data can be transmitted via radio waves.

When the local area network is configured by radio wave transmission, respective equipment need not be directly connected by signal lines or the like, and hence the system arrangement can be simplified.

When the local area network is realized by preparing a plurality of radio transmission apparatus, if signals are simultaneously transmitted from a plurality of transmission apparatus, there is then the possibility that a transmission error will occur. Therefore, a communication among respective transmission apparatus within the network should be access-controlled by some method.

As an access control method, in a small-scale radio network, for example, there is known a method in which a communication among respective transmission apparatus (nodes) within the network is managed by a transmission apparatus (root node) at the star-connection central portion in a centralized fashion.

In a centralized transmission line management based on the root node, initially, the root node determines a fixed frequency (channel) in such a manner that an interference may not occur in all nodes around the root node. Then, slots are allocated to the frequency and a communication between the nodes is executed in the respective allocated slots.

However, if such fixed slot allocation had been executed, a number of frequency bands (a plurality of channels) for preventing an interference with other systems would have been prepared although they are not used in actual transmission. Naturally, when a transmission of wide band information is assumed, it is inevitable that transmission bands as much as several times the frequency bands should be prepared.

According to the above-mentioned arrangement, it is difficult to effectively utilize limited frequency resources. In addition, it is difficult to cope with the case in which even the channel obtained by the initialization is disturbed by another system when information is transmitted or the case in which such channel disturbs the other system.

As a method of solving such problems, it is considered to design a transmission line by a CDMA (code division multiplexed access) system which is difficult to be affected by interference disturbance around the transmission line.

However, since this CDMA system is a technology for diffusing a signal upon transmission, if transmitted information is wide-band information, then a huge number of transmission bands are required.

In the conventional network transmission, there is generally used a method in which information is constantly transmitted under control of the root node. Here, in the radio network, if transmission that can be directly effected without the root node is directly effected between the nodes, then the radio resources may be utilized effectively. However, since it is general that the transmission between the nodes is controlled by the management of the radio resources based on the root node, if slots that are substantially close to the maximum transmission capacity are allocated at one portion of the network, for example, then substantially no slots can be allocated to the transmission between other nodes.

Further, in the slot transmission, when a control method does not return transmission status information, a judged result indicating the failure of transmission should be reported by another communication means. To report such judged result, a huge control system is required to allocate slots again by using an asynchronous communication.

SUMMARY OF THE INVENTION

It is an object of the present invention to provide a transmission control method and a transmission apparatus in which a transmission band can be utilized effectively by simple control.

According to an aspect of the present invention, there is provided a transmission method which is comprised of the steps of determining a management data transmission area and a data transmission area within a frame period, disposing a plurality of slots in the data transmission area and transmitting slot using situation data in each communication station or control station of the data transmission area in the management data transmission area.

According to the transmission method of the present invention, by a communication using the management data transmission area, each slot using situation within the data transmission area can be understood, collected and managed by the control station, for example.

According to another aspect of the present invention, there is provided a transmission apparatus which is comprised of a timing setting means for setting a frame period based on a predetermined synchronizing signal, setting a management data transmission area and a data transmission area within the frame period and further setting a plurality of slots in the data transmission area, a transmitting means for transmitting each slot using situation data of its own station in the management data transmission area and transmitting data in the data transmission area slot allocated by a control apparatus, and a receiving means for receiving data in the data transmission area slot allocated by the control apparatus.

According to the transmission apparatus of the present invention, based on the data received in the management data transmission area within the frame period, each slot using situation of its own station can be transmitted to the control apparatus side, and a control based on each slot using situation data becomes possible.

BRIEF DESCRIPTION OF THE DRAWINGS

FIGS. 9A through 9H are explanatory diagrams showing transmission states and reporting examples of slot using situations in the example of FIG. 8;

FIGS. 16A through 16H are explanatory diagrams showing transmission states and reporting examples of slot using situations in the example of FIG. 15.

DESCRIPTION OF THE PREFERRED EMBODIMENT

A transmission control method and a transmission apparatus according to an embodiment of the present invention will hereinafter be described with reference to the accompanying drawings.

In this embodiment, the present invention is applied to a network system arranged as a system for transmitting and receiving video data, audio data, computer data and so on within homes, offices and the like of relatively small scale. Initially, a system arrangement according to this embodiment will be described with reference to FIG. 1.

Figure 1:
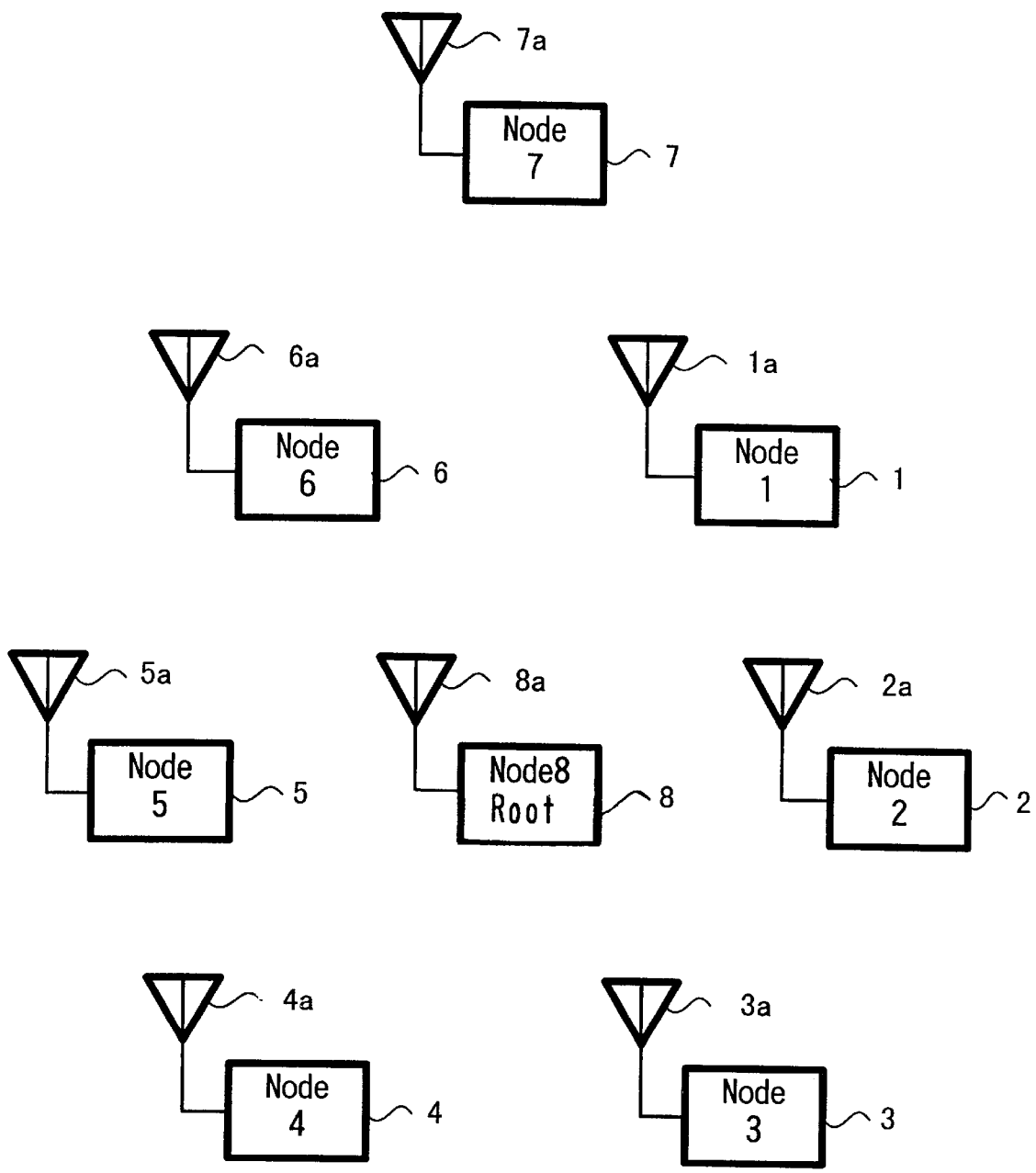
FIG. 1 is a schematic block diagram showing an example of a communication system according to an embodiment of the present invention.

In the network system according to this embodiment, a network is comprised of 16 radio transmission apparatus at maximum. FIG. 1 is a schematic diagram showing the state in which eight radio transmission apparatus 1 to 8 of 16 radio transmission apparatus are disposed. The radio transmission apparatus 1 to 8 include antennas 1a to 8a for transmitting and receiving data connected thereto respectively. A variety of processing apparatus (not shown) such as a video signal reproducing apparatus, a monitor apparatus, a computer apparatus, a printer apparatus and the like are individually connected to each of the radio transmission apparatus 1 to 8. When it is necessary to transmit data among these processing apparatus, data should be transmitted via the connected radio transmission apparatus. The eight radio transmission apparatus 1 to 8 function as nodes serving as communication stations and are individually given addresses as first to eighth nodes.

In this case, an arbitrary one radio transmission apparatus within the network system is set as a route node functioning as a control station. A radio communication among the respective nodes is executed by polling control from this root node. Fundamentally, as this root node, there is used a radio transmission apparatus disposed at the position at which it can directly communicate with all remaining nodes within the network system via radio waves. In this embodiment, the radio transmission apparatus 8 which is located at substantially the center of this network system is used as a root node. This network system is of a so-called star-connection arrangement in which this central node controls other nodes located around the central node.

Figure 2:
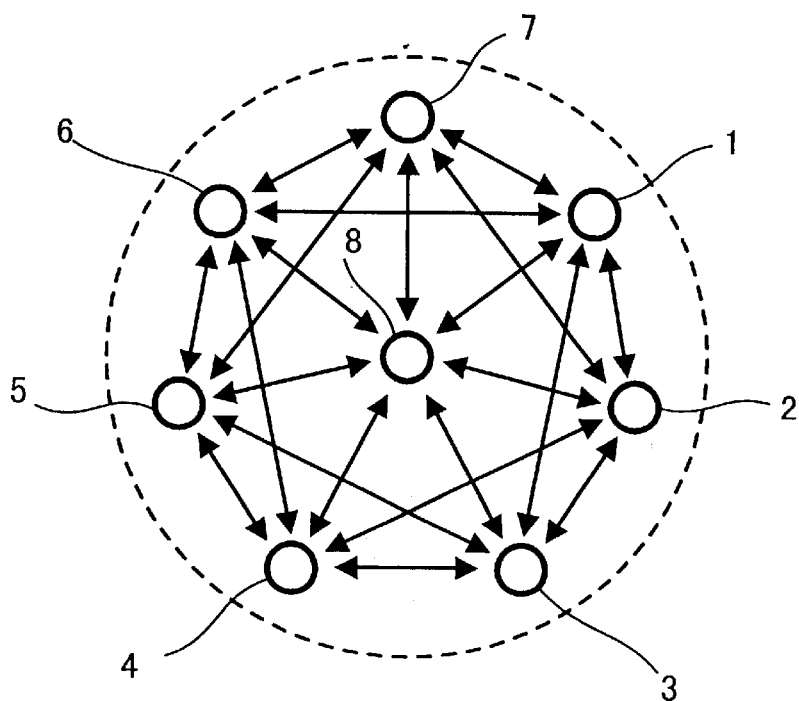
FIG. 2 is an explanatory diagram showing an example of a physical topology map according to an embodiment of the present invention.

FIG. 2 is a diagram showing a physical topology map obtained by the network arrangement according to this embodiment. As shown in FIG. 2, the root node 8 is located at the center, and other nodes 1 to 7, which can make a communication under control of the root node (control station) 8 are located around the central root node 8. Here, communications can be directly made between the nodes shown by arrows in FIG. 2. In this example, the nodes located at the adjacent positions or the adjacent nodes of the latter can directly communicate with each other. When the nodes which are unable to directly communicate with each other are intended to communicate with each other, the transmission processing can be executed by exchanging transmission data with other nodes.

Figure 3:
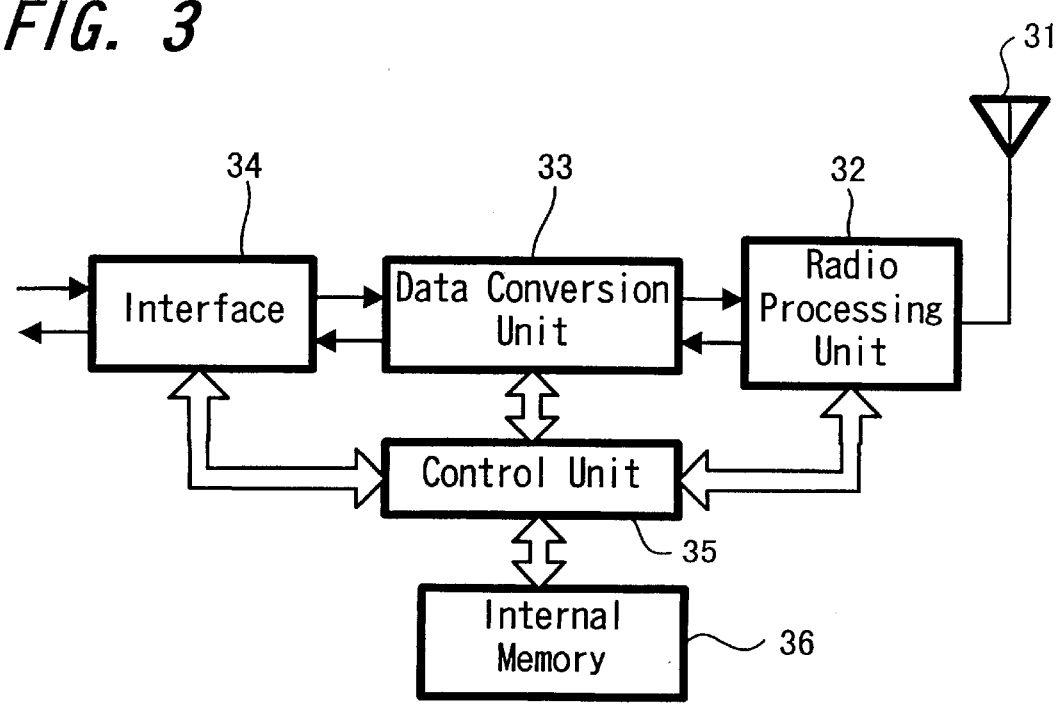
FIG. 3 is a schematic block diagram showing an example of a transmission apparatus according to an embodiment of the present invention.

FIG. 3 shows an example of an arrangement of each of the radio transmission apparatus 1 to 8 comprising the respective nodes. The respective radio transmission apparatus 1 to 8 have fundamentally a common arrangement (only the control arrangement for enabling the node to function as the root node differs from the arrangement of other nodes). Each of the radio transmission apparatus 1 to 8 comprises an antenna 31 for transmitting and receiving data and a radio processing unit 32 connected to this antenna 31 for effecting radio transmission processing and radio reception processing to be able to transmit data between it and other transmission apparatus by radio waves. In this case, as frequencies being transmitted and received at the radio processing unit 32 according to this embodiment, there are used frequencies of very high frequency bands (e.g. 5 GHz band). Moreover, in the case of this embodiment, as the transmission output, there is set a relatively weak output. When the radio transmission apparatus is used indoors, the transmission output is selected to be such a power that data can be transmitted from a distance ranging from several meters to several tens of meters by radio waves. Also, in the transmission processing and the reception processing executed at the radio processing unit 32 of this embodiment, a signal modulated by an OFDM (orthogonal frequency division multiplex) system is processed. Incidentally, a transmission output obtained when the radio processing unit 32 executes the transmission processing can be adjusted, and the transmission output from other nodes can be controlled by control data or the like.

Each of the radio transmission apparatus 1 to 8 includes a data conversion unit 33 for converting data of the signal received at the radio processing unit 32 and converting data of the signal transmitted by the radio processing unit 32. Data converted by this data conversion unit 33 is supplied to a processing apparatus (not shown) connected thereto through an interface unit 34, and data supplied from the connected processing apparatus is supplied through the interface unit 34 to the data converting unit 33, in which it can be converted.

Each unit within the radio transmission apparatus executes processing under control of a control unit 35 comprised of a microcomputer or the like. In this case, when the radio processing unit 32 receives a control signal, the received control signal is supplied through the data conversion unit 33 to the control unit 35, and the control unit 35 sets the respective units in the states shown by the received control signal. Also, with respect to the control signal transmitted from the control unit 35 to other transmission apparatus, the control signal is supplied from the control unit 35 through the data conversion unit 33 to the radio processing unit 32 and thereby transmitted via radio waves.

Figures 4A, 4B:
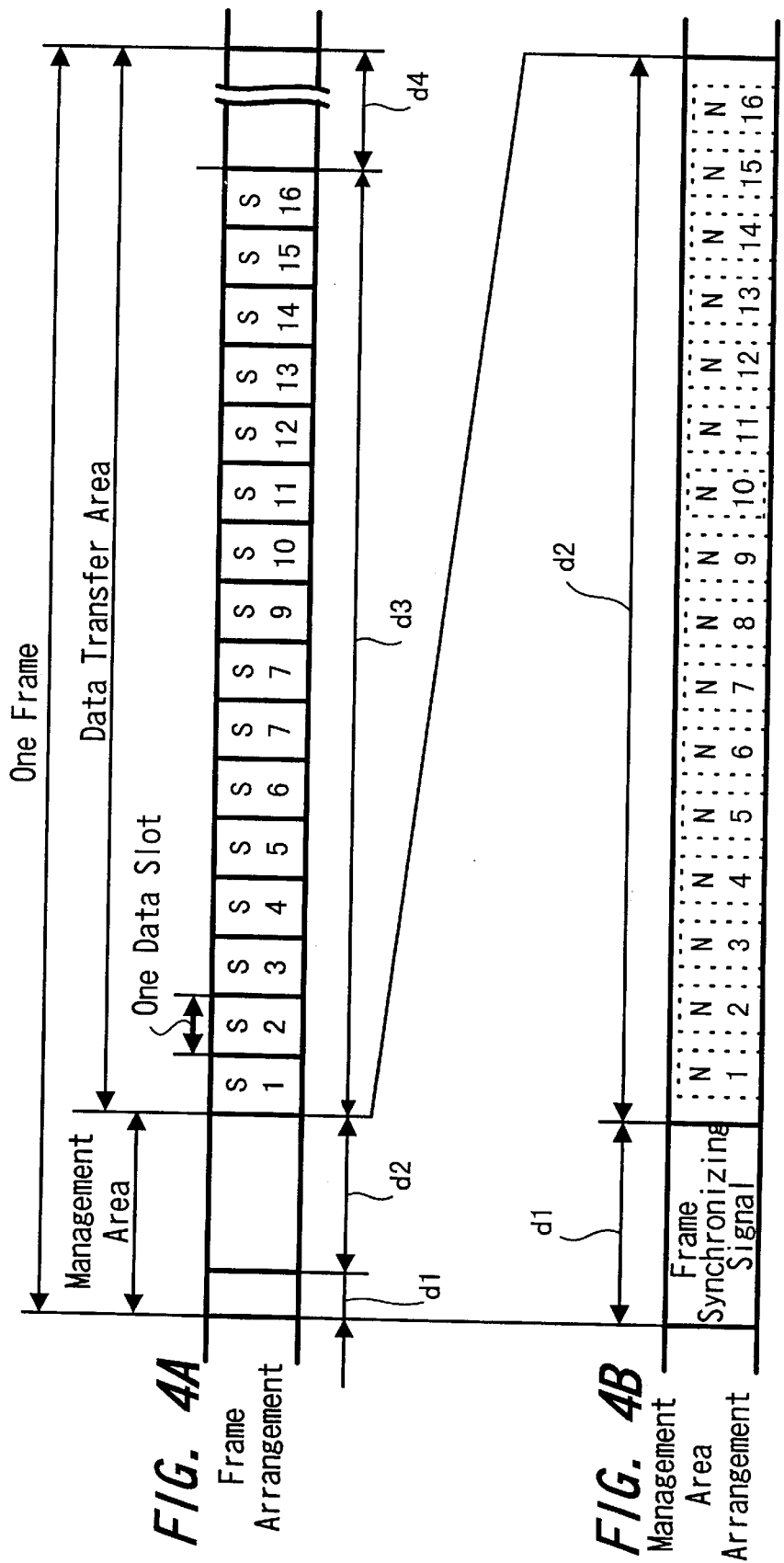
FIGS. 4A and 4B are explanatory diagrams showing examples of formats of transmission data according to an embodiment of the present invention.

Next, a signal transmitted between the respective nodes of the system thus arranged will be described. FIGS. 4A and 4B show a format of a signal transmitted among the respective nodes (radio transmission apparatus 1 to 8) within the network system according to this embodiment. In this embodiment, the frame period is standardized and data is transmitted. That is, as shown in FIG. 4A, one frame of a predetermined length is standardized, and a frame synchronizing area d1 of a predetermined period and a node synchronizing area d2 of a predetermined period which forms a management data transmission area are respectively set in the starting portion of one frame period. The remaining period is set to a data transfer (transmission) area. With respect to the data transfer area, there are set a stream packet transmission area d3 and an asynchronous transmission data area d4. The stream packet transmission area d3 is the area in which data such as video data or the like that should be transmitted at real-time is transmitted continuously. Here, 16 slots (data transmission slots) S1 to S16 are set in the area d3 at an equal interval.

In the frame synchronizing area d1, as shown in FIG. 4B, a frame synchronizing signal is transmitted from the root node. This frame synchronizing signal is received by other nodes and the frame periods are set in all nodes based on the reception timing of that synchronizing signal. The frame synchronizing signal is comprised of data of a predetermined bit number.

Figure 5:
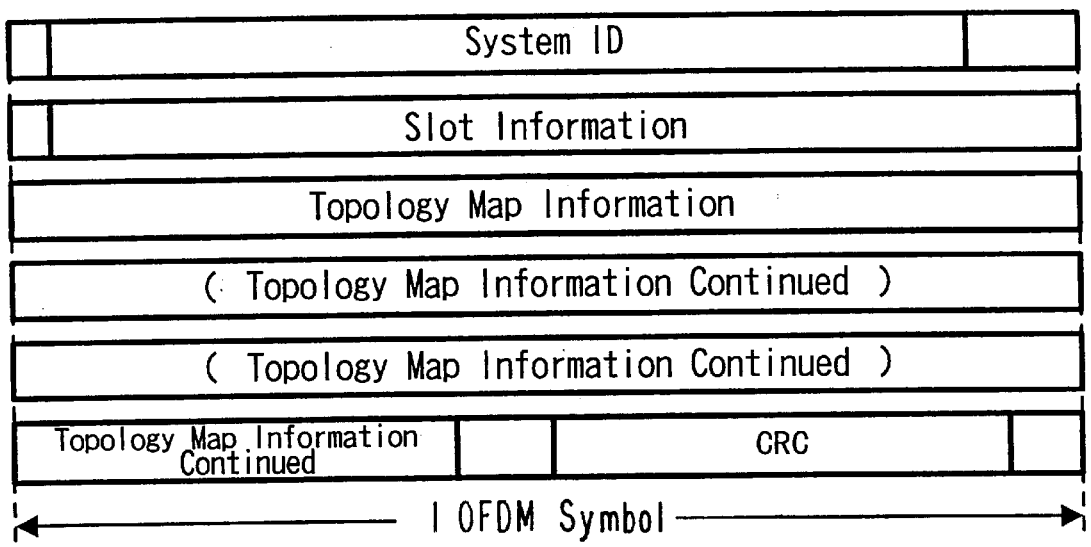
FIG. 5 is an explanatory diagram showing an example of a format of a down-channel control packet according to an embodiment of the present invention.

FIG. 5 is a diagram showing a format of a packet of a down-channel control signal transmitted from the root node as this frame synchronizing signal. The frame synchronizing signal of one unit, for example, is comprised of 6 OFDM symbols (1 OFDM symbol is one modulation unit data used when the OFDM modulation is implemented: e.g. 75 bits). In the 6 OFDM symbols, there are disposed, for example, 64-bit system ID, 72-bit slot information, 256-bit topology map information, and 32-bit CRC which is an error correction code. Here, the system ID is identification code data inherent in this network system, and the topology map information is information concerning nodes that can be communicated with respective nodes. This topology map information is generated by collecting node link information transmitted from respective nodes.

Referring back to FIGS. 4A and 4B, there are set 16 slots (node synchronizing slots) within the node synchronizing area d2 at an equal interval. The 16 slot within one frame are allocated to 16 nodes within this network system, respectively. When 16 slots are allocated, the 16 slots are allocated in the order of a first node slot N1, a second node slot N2, ..., 16th node slot N16 from the first slot, for example. The slots N1 to N16 that are allocated to the respective nodes are adapted to transmit the node synchronizing signal under control of the control unit of that node when the transmission line is maintained by the node corresponding to that slot.

Figure 6:
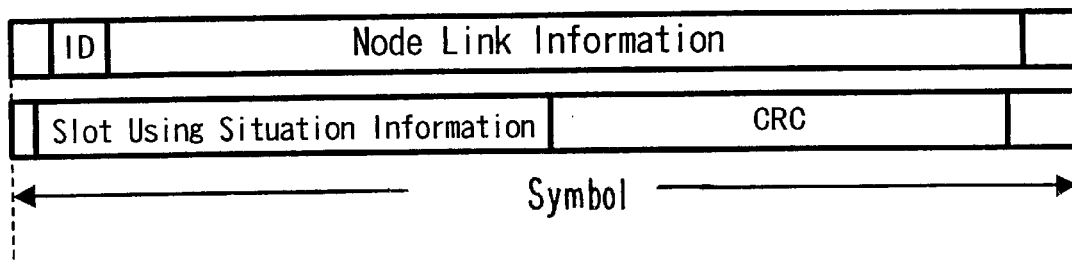
FIG. 6 is an explanatory diagram showing an example of a format of an up-channel control packet according to an embodiment of the present invention.

FIG. 6 is a diagram showing a format of an up-channel control packet transmitted from each node synchronizing slot. A node synchronizing signal of one unit, for example, is comprised of 2 OFDM symbols. In the 2 OFDM symbols, there are disposed, for example, 64-bit node link information, 36-bit slot using situation information and 32-bit CRC which is the error-correction code. Here, the node link information is information indicating other nodes within the network system from which a signal can be received by that node. The slot using situation information is information in which the using situations of 16 data transmission slots within the data transmission area are judged by that node. The slot using situation information is data represented by 2 bits at every slot. Having described examples of 2-bit data, data becomes "11" in the slot from which information is transmitted, data becomes "10" in the slot at which information is received, data becomes "01" in the slot which is utilized by another node (i.e. busy state) and, data becomes "00" in the slot which can be used (i.e. slot that is judged as a vacant slot). Incidentally, with respect to the slots which are in the busy state, there are two types of busy states in which the slot is used by other nodes within the system for transmission and in which the slot is used by the node within the adjacent other system for transmission. Examples of transmission states of slot using situation information will be described later on.

The node synchronizing signal, transmitted from each slot in the node synchronizing area d2 is received by the root node, and judged by the control unit of the root node, for example. At that time, based on the judged result of the position of the slot which received the synchronizing signal, there can be judged the node from which the node synchronizing signal was transmitted.

Next, the node synchronizing signal transmission processing and reception processing will be described with reference to FIGS. 7A to 7H. As described above, there are prepared 16 slots in the node synchronizing area d2. Here, to simplify the description, it is assumed that there are prepared eight slots from the first slot to the eighth slot in the node synchronizing area d2. Of the first to eighth slots, the first slot to the seventh slot are individually allocated to eight nodes 1 to 8 of the first to eighth nodes.

Figure 7:
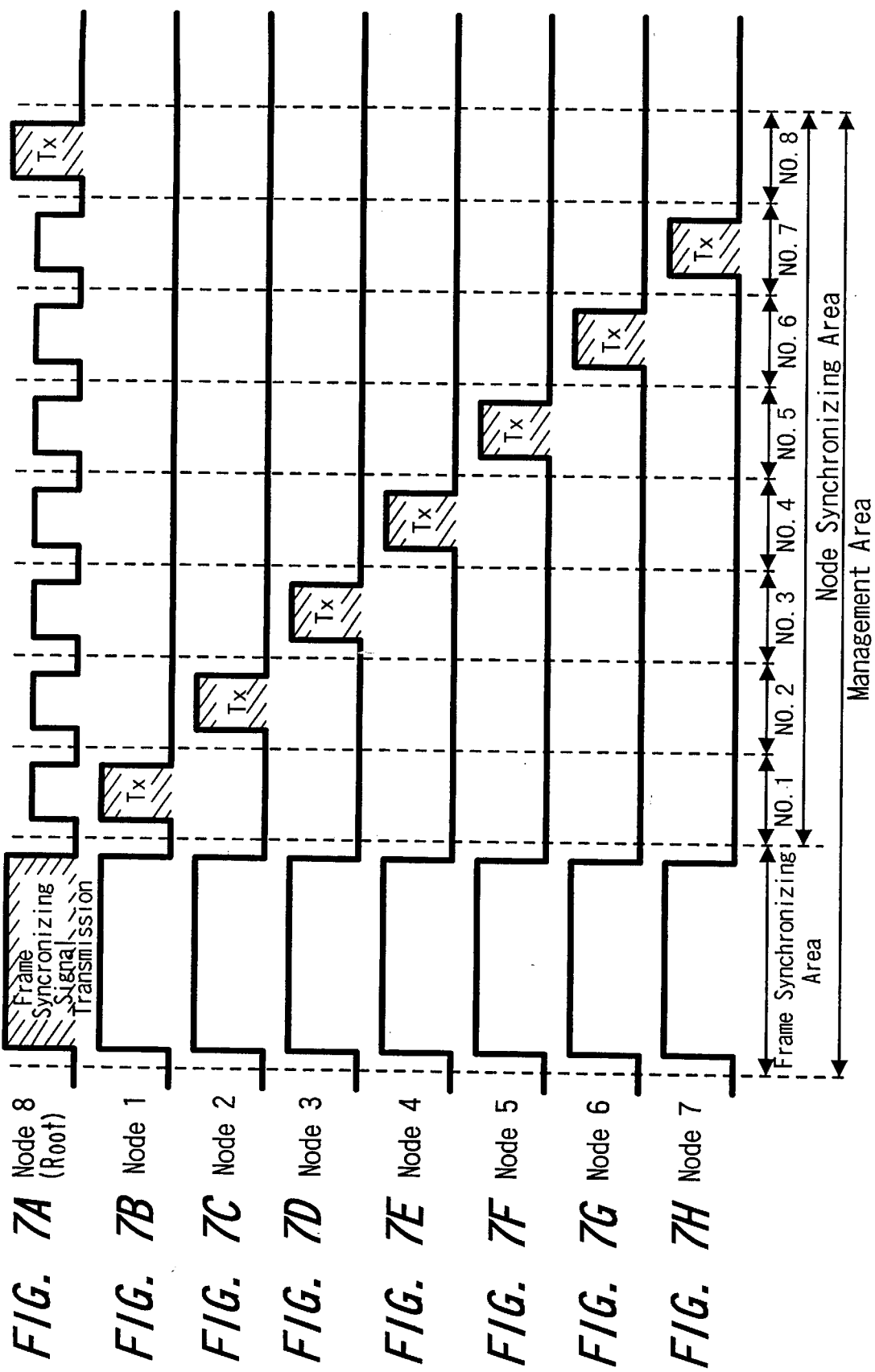
FIGS. 7A through 7H are timing charts showing an example of processing at the node synchronization according to an embodiment of the present invention.

FIGS. 7A to 7H show the communication states of eight nodes, and FIG. 7A shows the communication state of the eighth node which is the root node. FIGS. 7B to 7H show the communication states of the first node 1 to the seventh node 7, in that order. In FIGS. 7A to 7H, ranges shown hatched illustrate the states in which the radio processing unit 32 which is the transmission means in that node executes the transmission processing and information is transmitted from the antenna 31 by radio waves. The node synchronizing signals TX transmitted from the respective nodes 1 to 7 are received at the radio processing unit 32 of the root node 8 as shown by a pulse-like reception period in FIG. 7A. The node synchronizing signals TX transmitted from the respective nodes 1 to 7 are also received by the nodes located at the positions adjacent to the transmission node and which are located at the positions at which they can directly receive the signal transmitted from that node. Node link information at that node is generated from the received node synchronizing signal and its node link information is added to the node synchronizing signal transmitted during the next frame period.

Figure 8:
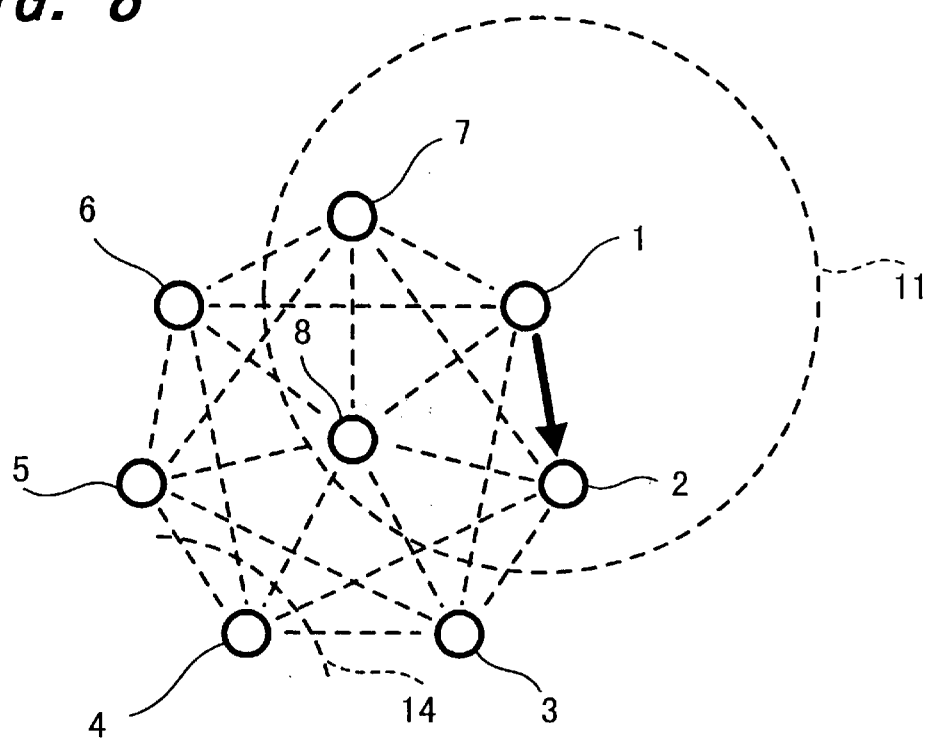
FIG. 8 is an explanatory diagram showing an example of transmission according to an embodiment of the present invention.

Next, examples of the slot using situation information generation processing and transmission states will be described together with data transmission examples in actual practice. Initially, as shown in FIG. 8, let it be assumed that data is transmitted within the network system. That is, data is transmitted from the first node 1 to the second node 2 in the stream packet transmission area d3. A range in which such transmission can reach is an area 11. This data transmission uses 12 slots of the slot S1 to the slot S12 within 16 slots of one frame. Also, the fourth node 4 receives a disturbance wave from another adjacent network 14 at the slots S7 to S13. Incidentally, the nodes which can directly receive the signal transmitted from the first node 1 are limited to the second node 2, the seventh node 7 and the eighth node (root node) 8 which are located at the positions adjacent to the first node 1.

At that time, FIGS. 9A to 9H show the states of the respective data transmission slots S1 to S16 of the stream packet transmission area d3 at the respective nodes 1 to 8. That is, in the root node 8, as shown on the left-hand side of FIG. 9A, the signal from the first node 1 to other nodes is received at the slots S1 to S12. As slot using situation information, as shown on the right-hand side of FIG. 9A, data of the 12 slots become data "01" in the busy state, and data of the remaining 4 slots become data "00" of the slots that can be used.

In the first node 1, as shown on the left-hand side of FIG. 9B, since data is transmitted by the slots S1 to S12 for the second node 2, as slot using situation information, as shown on the right-hand side of FIG. 9B, data of 12 slots become data "11" of the transmission state, and data of the remaining 4 slots become data "00" of the slots that can be used.

In the second node 2, as shown on the left-hand side of FIG. 9C, since data transmitted from the first node 1 is received at the slots S1 to S12, as slot using situation information, as shown on the right-hand side of FIG. 9C, data of 12 slots become "10" of the reception state, and data of the remaining 4 slots become data "00" of the slots that can be used.

In the fourth node 4, as shown on the left-hand side of FIG. 9E, since data transmitted from other network system is received at the slots S7 to S13 as a disturbance wave, as slot using situation information, as shown on the right-hand side of FIG. 9E, data of 7 slots become data "01" of the busy state, and data of the remaining 9 slots become data "00" of the slots that can be used.

Also, in the root node 8 which can directly receive the signal from the first node 1, as shown on the left-hand side of FIG. 9H, the signal from the first node 1 to other node is received at the slots S1 to S12. As slot using situation information, as shown on the right-hand side of FIG. 9H, data of 12 slots become data "01" of the busy state, and data of the remaining 4 slots become data "00" of the slots that can be used.

In other nodes (the third node 3, the fifth node 5, the sixth node 6), as shown in FIGS. 9D, 9F, 9G, data of 16 slots become data "00" of the slots that can be used.

Slot using situation information generated by the respective nodes are judged and generated by the control unit 35 within the communication apparatus comprising the node, temporarily stored in an internal memory 36 (see FIG. 3), and the memorized slot using situation information is read out and transmitted during the next frame period at the timing at which the node synchronizing signal is transmitted from that node.

The slot using situation information thus generated by the respective nodes are transmitted to the root node as the node synchronizing signals, whereby the root node can judge the using situations of the respective slots within the network system and slots can be efficiently allocated within the network based on the judged using situation information.

Next, the manner in which the node synchronizing signal is transmitted under control of the control unit 35 in the communication apparatus comprising each node will be described with reference to a flowchart of FIG. 10.

Figure 10:
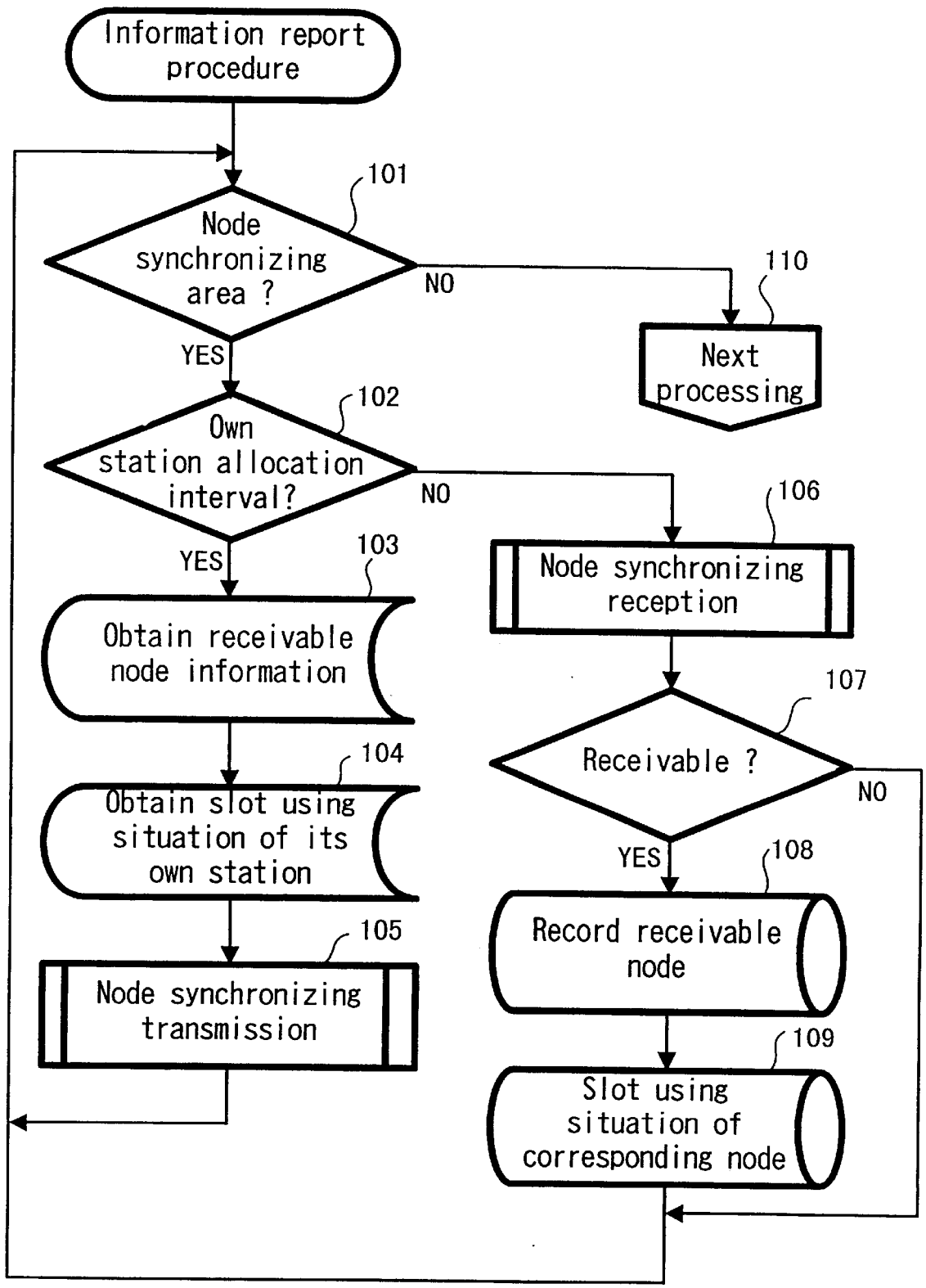
FIG. 10 is a flowchart showing an example of a reporting procedure in the up-channel control transmission area according to an embodiment of the present invention.

Referring to FIG. 10, it is determined at a decision step 101 whether or not the frame is the node synchronizing area. If the frame is the node synchronizing area as represented by a YES at the decision step 101, then control goes to the next decision step 102, whereat it is judged whether or not the node synchronizing area is the slot interval allocated to its own station. If the node synchronizing area is the slot interval allocated to its own station as represented by a YES at the decision step 102, then control goes to a step 103, whereat other node information (stored in the internal memory 36 connected to the control unit 35) that can be received by that node is read out under control of the control unit 35. Also, at step 104, the control unit 35 reads out the slot using situation information of its own station generated during the immediately-preceding frame period or the like, and transmits the node synchronizing signal with such each information added thereto at a step 105. Then, control goes back to the step 101.

If on the other hand the node synchronizing area is not the slot interval of its own station as represented by a NO at the decision step 102, then control goes to a step 106, whereat a node synchronizing signal transmitted from other node is received. It is determined at the next decision step 107 whether or not such received node synchronizing signal can be received. If the received node synchronizing signal can be received as represented by a YES at the decision step 107, then control goes to a step 108, whereat such node synchronizing signal that can be received is stored in the internal memory 36 under control of the control unit 35.

Then, at a step 109, the using situation information of the data transmission slot of its own station during this frame period can be generated under control of the control unit 35. Then, control goes back to the step 101. If it is judged that the node synchronizing signal cannot be received at all as represented by a NO at the decision step 107, then control goes back to the step 101. Then, if it is judged that the node synchronizing area is ended as represented by a NO at the decisions step 101, then control goes to the next step 110.

Figure 11:
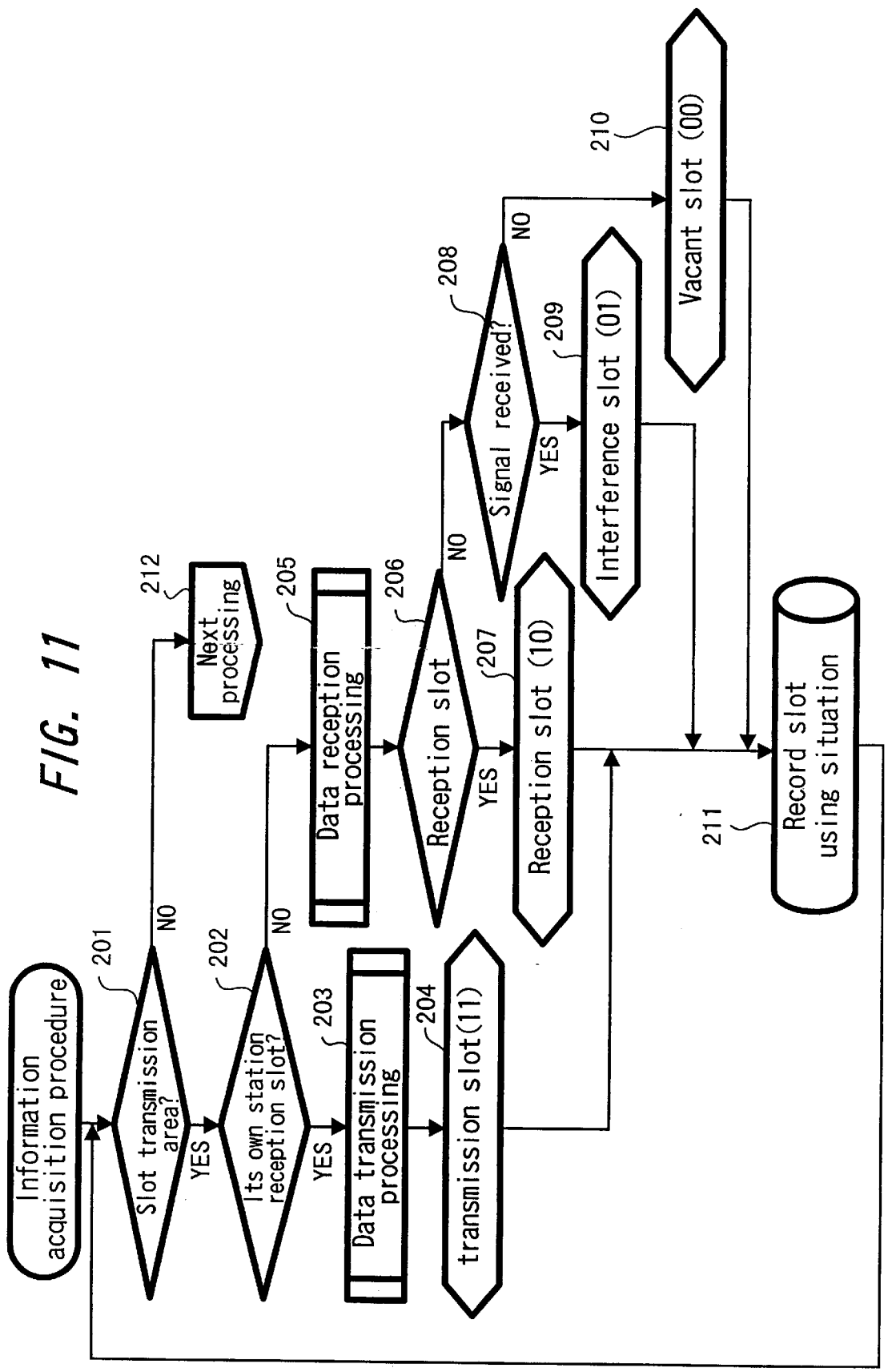
FIG. 11 is a flowchart showing an example of a slot information acquisition procedure according to an embodiment of the present invention.

Then, a processing in which each node generates slot using situation information within the data transfer area will be described with reference to a flowchart of FIG. 11. Referring to FIG. 11, it is determined at a decision step 201 whether or not the frame is the area (i.e. stream packet transmission area) of the data transmission slot. If the frame is the data transmission slot area as represented by a YES at the decision step 201, then control goes to the next decision step 202, whereat it is judged whether or not such data transmission slot area is the slot allocated to the transmission slot of its own station. If the slot is the slot allocated to the transmission slot of its own station as represented by a YES at the decision step 202, then control goes to a step 203, whereat data is transmitted under control of the control unit 35, and data "11" indicating the transmission slot is generated as the slot using situation information.

If on the other hand the slot is not the transmission slot allocated to its own station as represented by a NO at the decision step 202, then control goes to a step 205, whereat such slot data is received. Then, control goes to the next decision step 206, whereat it is judged whether or not such reception of data is the reception of data transmitted to its own station. If such reception of data is judged to be the reception of data transmitted to its own station as represented by a YES at the decision step 206, then control goes to a step 207, whereat data "10" indicating the reception slot is generated as slot using situation information under control of the control unit 35.

If the slot is judged not to be the reception of data transmitted to its own station as represented by a NO at the decision step 206, then control goes to the next decision step 208, whereat it is determined by the control unit 35 whether or not a signal is received. If a signal is received as represented by a YES at the decision step 208, then control goes to a step 209, whereat data "01" indicating the slot of the busy state interfered by a signal of other station is generated as slot using situation information. If on the other hand a signal is not received as represented by a NO at the decision step 208, then control goes to a step 210, whereat data "00" indicating a vacant slot is generated as slot using situation information under control of the control unit 35.

In a step 211, under control of the control unit 35, slot using situation information generated at the steps 204, 207, 209, 210 are recorded (stored) in the internal memory 36 connected to the control unit 35 of that node.

Next, a processing in which the root node allocates the data transmission slots in order to transmit data within the network system based on the thus generated slot using situation information will be described with reference to a flowchart of FIG. 12. While the root node collectively effects the slot management, the present invention is not limited thereto, and the judgments shown in the flowchart of FIG. 12 may be executed independently by the respective nodes and the respective nodes may execute independently the slot allocation processing.

Figure 12:
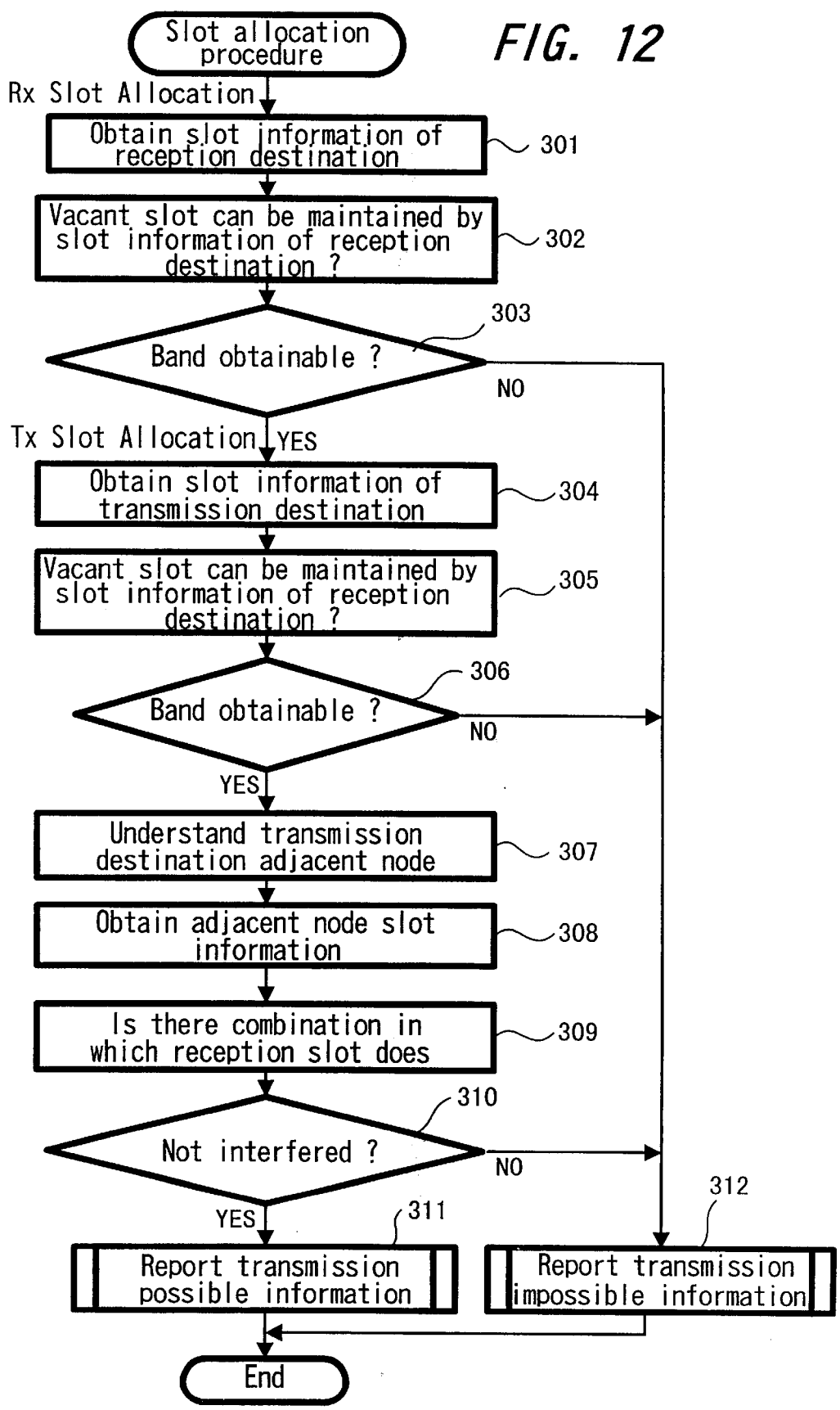
FIG. 12 is a flowchart showing an example of a slot allocation procedure according to an embodiment of the present invention.

Referring to FIG. 12, at a step 301, the root node obtains slot information of reception destination node. In the next step 302, only slot portion that is not interfered can be used in transmitting corresponding information amount. Then, it is determined at the next decision step 303 whether or not such slot portion can be used for transmission. If the transmission is not possible as represented by a NO at the decision step 303, then control goes to a step 312, whereat transmission impossible information is transmitted.

If the transmission is judge to be possible as represented by a YES at the decision step 303, then control goes to a step 304, whereat the root node confirms the allocation of the slots on the transmission side. That is, in order to confirm the slots on the transmission side, at the step 304, slot information of the transmission destination side is acquired, and at a step 305, only the slot portion which is not interfered can be used in transmitting the corresponding information amount. Then, in the next decision step 306, it is determined whether or not such slot portion can be used in transmission. If the transmission is not possible as represented by a NO at the decision step 306, then control goes to the step 312, whereat the transmission impossible information is informed.

If the transmission is judged to be possible as represented by a YES at the decision step 306, then the root node confirms the slot using situation in the adjacent node. In order to confirm this adjacent node, at a step 307, information of transmission destination adjacent node that can receive the signal of the transmission node is obtained, and at the next step 308, slot using information of these nodes is obtained. Then, control goes to a step 309, whereat it is confirmed that there is any combination in which reception slot do not exist in these information while the reception slots overlapping with slots that are to be allocated. Then, control goes to the next decision step 310 where at it is judged whether or not a slot allocation without interference is possible. If the slot allocation without interference is possible as represented by a YES at the decision step 310, then control goes to a step 311, whereat transmission possible information is informed. If on the other hand the slot allocation without interference is not possible as represented by a NO at the decision step 310, the control goes to the step 312, whereat the transmission impossible information is informed.

Next, a procedure in which each node reports slot transmission reception possible/impossible information as slot using situation information at the up-channel control transmission area will be described with reference to a flowchart of FIG. 13.

Figure 13:
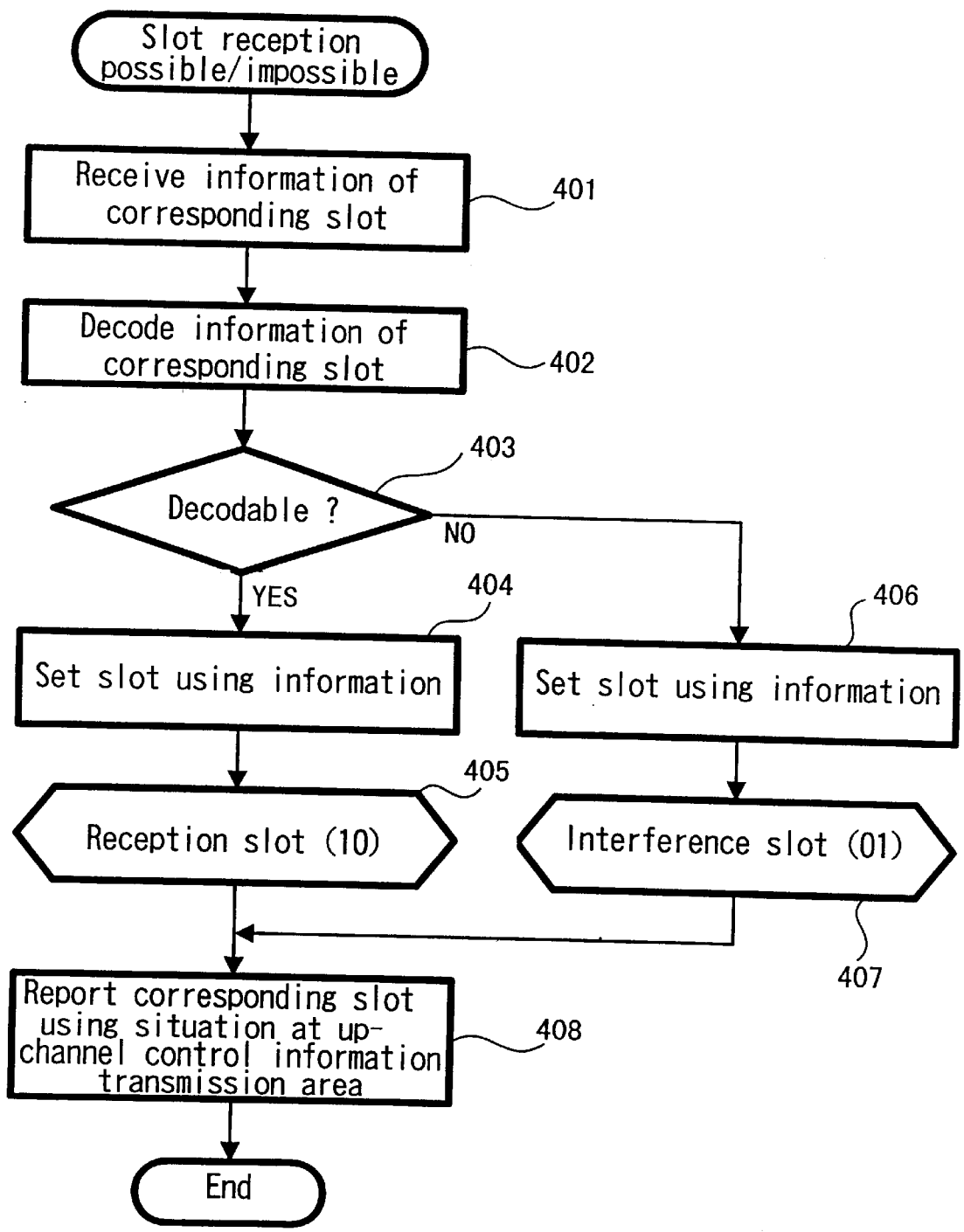
FIG. 13 is a flowchart showing an example of a slot receivable reporting procedure according to an embodiment of the present invention.

Referring to FIG. 13, at a step 401, each node receives a signal of a corresponding slot, and at a step 402, each node decodes information transmitted at that slot. It is determined at the next decision step 403 whether or not such information can be decoded. If such information can be decoded as represented by a YES at the decision step 403, the control goes to a step 404, whereat slot using information is obtained from data stored in the memory. Then, slot using information of that slot portion is registered as reception slot (data "10") at a step 405. If such information cannot be decoded (or such information cannot be received) as represented by a NO at the decision step 403, then control goes to a step 406, whereat such slot using information is obtained from data stored in the memory. Then, such slot using information of that slot portion is reregistered as interference slot (data "01") at a step 407.

Then, each node transmits the corresponding slot using situation information to the root node or the like by the slot of the node synchronization area allocated to the own station at step 408,thereby to perform a report.

Figure 14:
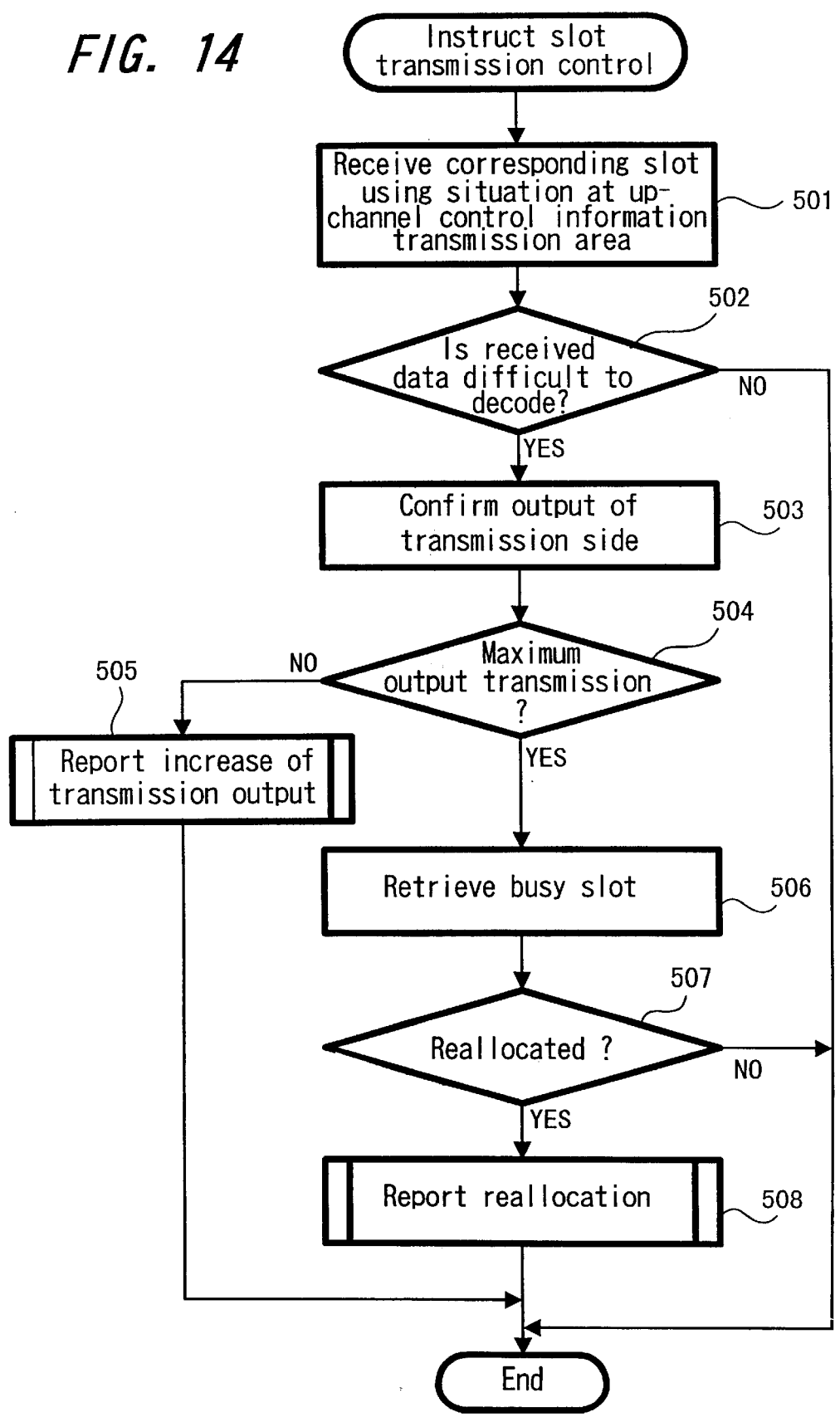
FIG. 14 is a flowchart showing an example of a slot transmission control according to an embodiment of the present invention.

Next, a procedure in which the root node or the like effects transmission control based on the information thus transmitted will be described with reference to a flowchart of FIG. 14. When the root node effects the transmission control processing in a centralized fashion, this transmission control processing is executed by the root node, and when the transmission control management is executed by the transmission destination node, this transmission control processing is executed by the transmission destination node.

Figure 15:
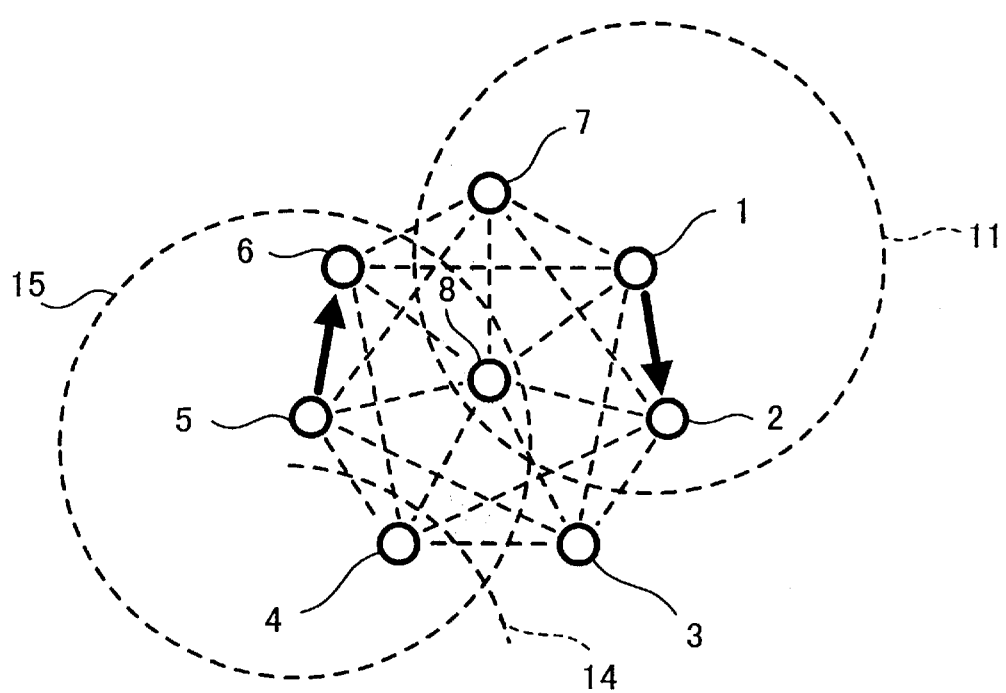
FIG. 15 is an explanatory diagram showing an example of other transmission according to an embodiment of the present invention.

Referring to FIG. 15, at a step 501, information reported at the up-channel control information transmission area is received, and there is executed a processing for judging whether or not a portion reported as an interference slot (slot that cannot be decoded) exists although it is requested to receive such information in actual practice. In the next decision step 502, it is determined whether or not the slot that cannot be decoded exists. If the slot that cannot be decoded exists as represented by a YES at the decision step 502, then control goes to a step 503, whereat the output from the transmission side is confirmed. Then, in the next decision step 504, it is determined whether or not the confirmed transmission output is the maximum output. If the confirmed transmission output is not the maximum output as represented by a NO at the decision step 504, then control goes to a step 505, whereat such a report that the transmission output is raised is informed. If the confirmed transmission output is judged to be the maximum output as represented by a YES at the decision step 504, then control goes to a step 506, whereat the slot in the busy state is retrieved. Then, in the next decision step 507, it is determined whether or not the slot can be reallocated. If the slot can be reallocated as represented by a YES at the decision step 507, then control goes to a step 508, whereat the reallocation is informed. If on the other hand the slot that cannot be decoded exists as represented by a NO at the decision step 502 and if the reallocation is impossible as represented by a NO at the decision step 507, then processing is ended.

Incidentally, it is possible to arrange the system such that, even when the reallocation is impossible, if such transmission is continued and interference is recovered, then a transmission may be continued such that information can be decoded.

FIG. 15 and FIGS. 16A to 16H show the cases in which the slot is reallocated. Let it be assumed that slots are allocated as already shown in FIGS. 8 and 9, for example. That is, as shown in FIG. 15, 12 slots from the slots S1 to S12 are used to transmit data to the first node 1 from the second node 2. The fourth node 4 receives a disturbance wave from the other adjacent network 14 at its slots S7 to S13. At that time, as shown in FIG. 15, let us consider the case in which data transmission request is issued from the fifth node 5 to the sixth node 6. Under control of the root node 8 or the like, it is judged that data transmission from the fifth node 5 may not interfere the transmission in other node. Then, as shown in FIG. 16F, for example, data transmission Tx from the fifth node 5 is executed by using 8 slots from the slots S9 to S16. Then, as shown in FIG. 16G, the reception Rx of this transmission period is executed by the sixth node 6. A range in which the transmission from this node 5 can reach is an area 15.

As described above, by reporting information of slots that can be used, so long as an interference does not affect the existing transmission, it becomes possible to allocate slots in an overlapping fashion.

Not only detecting the interference disturbance within the network but also detecting the interference disturbance from an adjacent similar network, its recognition and its control for avoiding such interference disturbance also become possible. Alternatively, it is possible to detect an interference disturbance from other perfectly different system. Then, it becomes possible to allocate slots so as to avoid the interference portion.

Also, even when frequency bands (a plurality of channels) cannot be prepared sufficiently in order to avoid the interference, slots can be allocated so as to avoid the interference.

That is, when a wide band information transmission line is designed, in order to set one transmission channel, it becomes unnecessary to maintain a large number of useless channels in order to prevent an interference by utilizing vast frequency resources. Therefore, a frequency utilization ratio including other systems can be improved. Thus, by effecting a slot management on each node and by executing an optimum slot allocation, it becomes possible to efficiently avoid the interference within the system and interference with the systems around the system.

Further, with respect to the corresponding transmission, when the control processing in which its transmission possible/impossible information is not returned is executed, the transmission possible/impossible judged result is used to control the network by using this report portion, whereby a complex control can be avoided.

While the present invention is applied to the small-scale network as described above, the present invention is not limited thereto, and it is needless to say that the present invention may also be applied to a large-scale communication network and a public line network.

While the slot management processing is described so far with respect to the case in which information is directly transmitted among the respective nodes as described above, the present invention is not limited thereto, and can be applied to the case in which information is relayed by a certain node and then transmitted.

While the OFDM system is applied as the transmitted signal modulation system as described above, the present invention is not limited thereto, and may also be applied to transmission processing based on other modulation systems.

Also, while the frame format is illustrated as one of preferred examples as described above, the present invention is not limited to that frame format, and may also be applied to various kinds of frame formats that can be suitably applied to the transmission system for use with a network system. For example, in the above-mentioned respective examples, although the frame synchronizing area and the node synchronizing area are disposed at the starting portion of each frame, they may be disposed at other positions within one frame. Further, while the node synchronizing signal is transmitted at every frame in one frame period, the present invention is not limited thereto, and the node synchronizing signal may be transmitted once at every predetermined number of frames. Furthermore, it is possible that the node for transmitting the frame synchronizing signal and the root node for effecting the communication control based on the data such as the node synchronizing area or the like may be different nodes.

According to the transmission control method of the present invention, in the communication using the management data transmission area, each slot using situation within the data transmission area can be understood and the transmission state at each slot can be efficiently managed by collecting each slot using situation at the control station, for example.

Also, since data of interference disturbance situation from other system at each slot can be transmitted in the management data transmission area together with data of each slot using situation, it becomes possible to effect efficient slot management considering the interference disturbance situation.

Also, since the slots that were already allocated to the radio transmission among a plurality of communication stations are allocated in an overlapping fashion in a range in which they will not interfere with the radio transmission in order to effect the radio transmission among a plurality of other communication stations, it becomes possible to more efficiently utilize communication resources based on data of each slot using situation.

Further, since each communication station receives the transmission signal of the allocated slot, judges whether or not such transmission signal can be decoded, and reports the judged results to the control station, it is possible for the control station to judge whether or not a communication among the communication stations can be effected satisfactorily, the slots can be properly allocated to each communication station.

Further, since each slot using situation is managed by each communication station in a distributed fashion, an efficient communication bypassing the control station becomes possible.

Further, according to the transmission apparatus of the present invention, each slot using situation of its own station can be transmitted to the control apparatus side based on the data received at the management data transmission area within one frame period, and an efficient and satisfactory transmission control based on the data of each slot using situation becomes possible.

Further, since the transmission means transmits the data of interference disturbance situation data from other system in each slot together with data of each slot using situation in the data management transmission area, a more efficient slot management considering also the interference disturbance situation becomes possible.

Furthermore, since the transmission apparatus includes the judgment means for judging whether or not data of each slot received by the reception means can be decoded and the judged result data from this judgment means is transmitted from the transmission means in the management data transmission area, it becomes possible to allocate slots considering the actual transmission states.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A transmission control method in which a radio transmission access among a plurality of communication stations is controlled by a control station, the transmission control method comprising the steps of:
   standardizing a frame period based on a synchronizing signal transmitted by a predetermined station from among the plurality of communication stations;
   setting a management data transmission area and data transmission area within said frame period;
   disposing a plurality of slots in said management data transmission area; and
   transmitting slot-using-situation data relative to each communication station or relative to said control station at said data transmission area in said management data transmission area.

2. The transmission control method as claimed in claim 1, wherein interference-disturbance-situation data from other systems at each slot also is transmitted in said management data transmission area together with said slot-using-situation data.

3. The transmission control method as claimed in claim 1, wherein said control station allocates the plurality of slots among said plurality of communication stations in an overlapping fashion in a range in which said plurality of slots will not interfere with a radio transmission in order to effect radio transmission among a plurality of other communication stations.

4. The transmission control method as claimed in claim 1, wherein each of said plurality of communication stations receives a respective transmission signal in one of said plurality of slots allocated thereto, judges whether said transmission signal can be decoded, and reports a judged result to said control station.

5. The transmission control method as claimed in claim 1, wherein said each slot-using situation is managed by each communication station in a distributed fashion.

6. A transmission apparatus in which communication is effected under access control from a predetermined control apparatus, said transmission apparatus comprising:
   timing setting means for setting a frame period based on a predetermined synchronizing signal, for setting a management data transmission area and a data transmission area within said frame period, and for setting a plurality of slots in said management data transmission area;
   transmission means for transmitting slot-using-situation data of its own station in said management data transmission area and also transmitting data in a slot of the data transmission area allocated by said control apparatus; and
   reception means for receiving data in the slot of the data transmission area allocated by said control apparatus.

7. The transmission apparatus as claimed in claim 6, wherein said transmission means transmits interference-disturbance-situation data from other systems in said management data transmission area together with said slot-using-situation data.

8. The transmission apparatus according to claim 6, further comprising judgment means for judging whether data of each slot received by said reception means can be decoded and wherein judged result data of said judgment means is transmitted in said management data transmission area by said transmission means.

* * * * *